3,542,996
AUTOMATIC CONTROL SYSTEM FOR ANGULAR AND PLANAR ELECTRODE ORIENTATION
John G. Bollinger and Howard L. Harrison, Madison, Wis., and Michael A. Stankey, Rockford, Ill., assignors to A. O. Smith Corporation, Milwaukee, Wis., a corporation of New York
Original application Apr. 18, 1966, Ser. No. 543,180, now Patent No. 3,452,180, dated June 24, 1969. Divided and this application Apr. 9, 1969, Ser. No. 814,708
Int. Cl. B23k 9/12
U.S. Cl. 219—125                     5 Claims

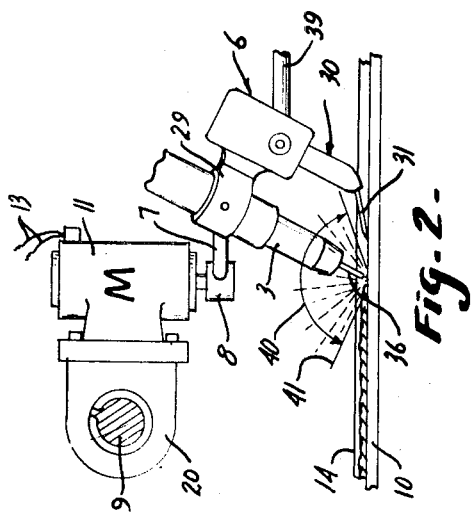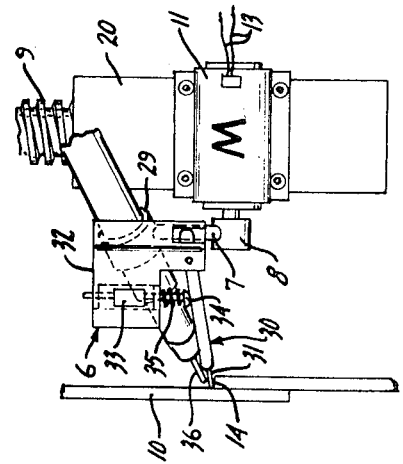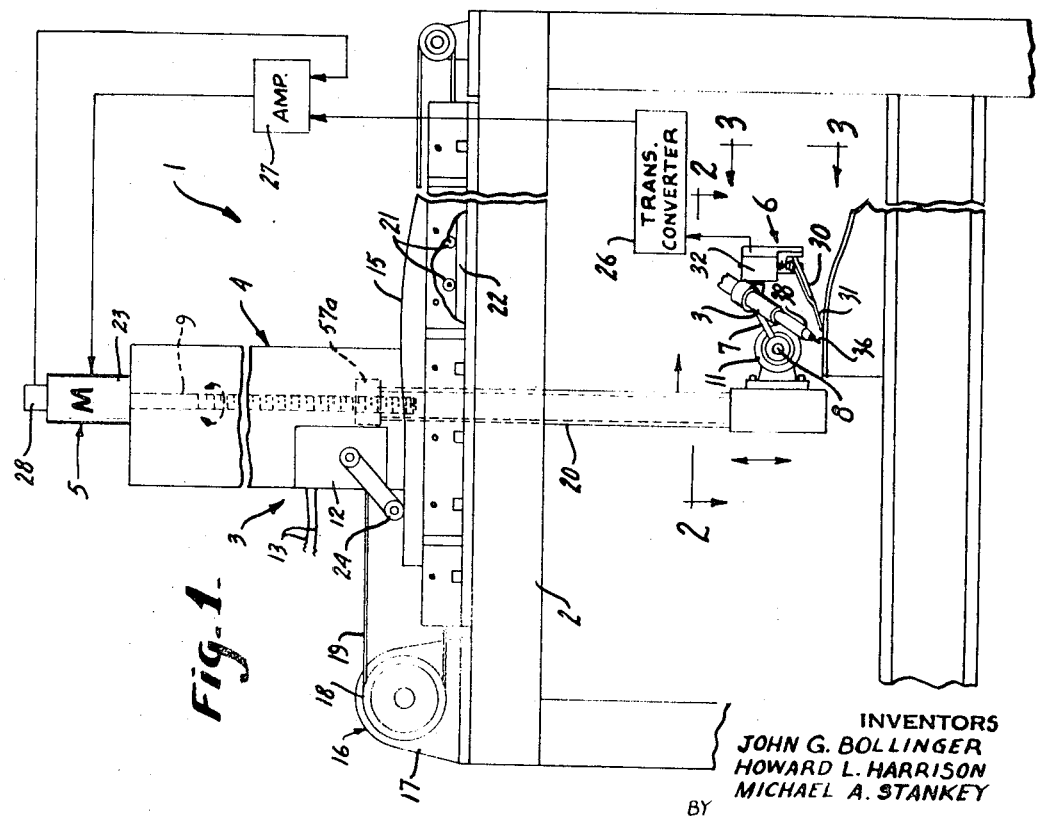

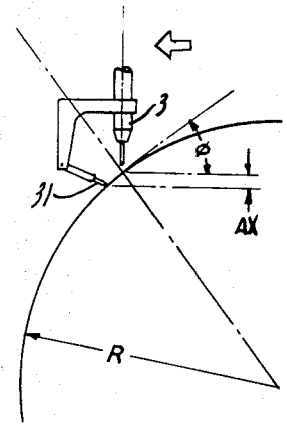
Fig. 4.
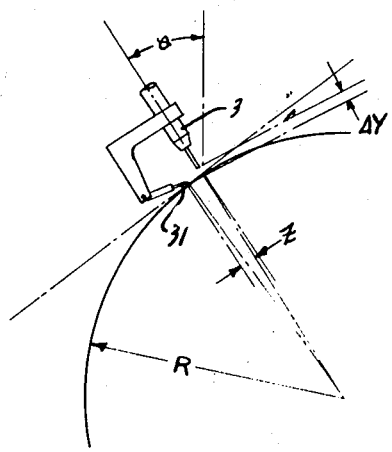
Fig. 5.
Fig. 6.
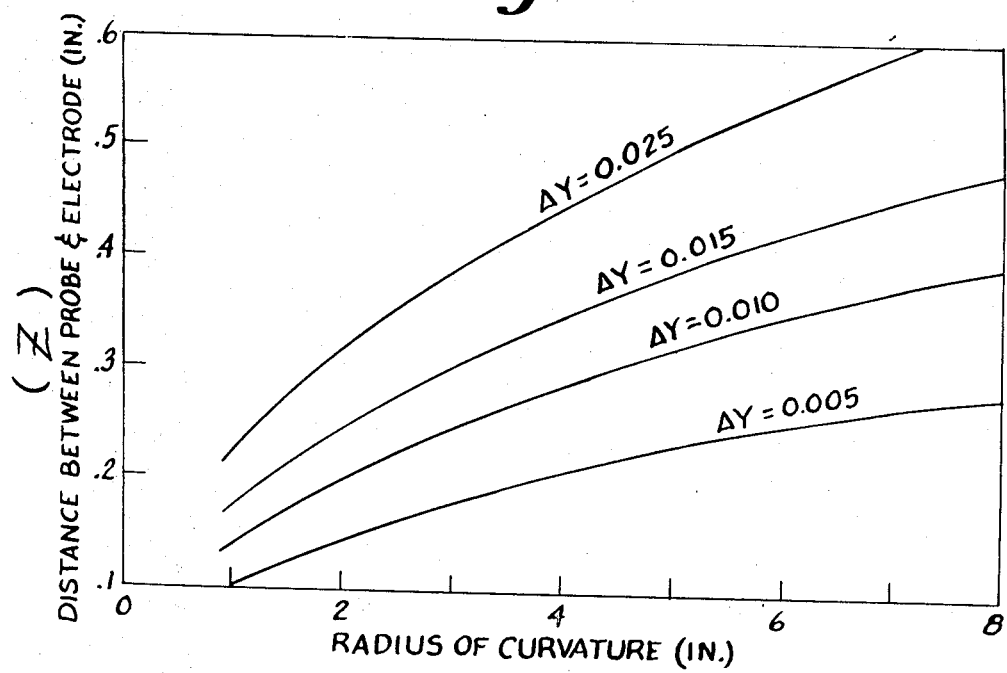
INVENTORS
JOHN G. BOLLINGER
HOWARD L. HARRISON
MICHAEL A. STANKEY
BY
Attorneys

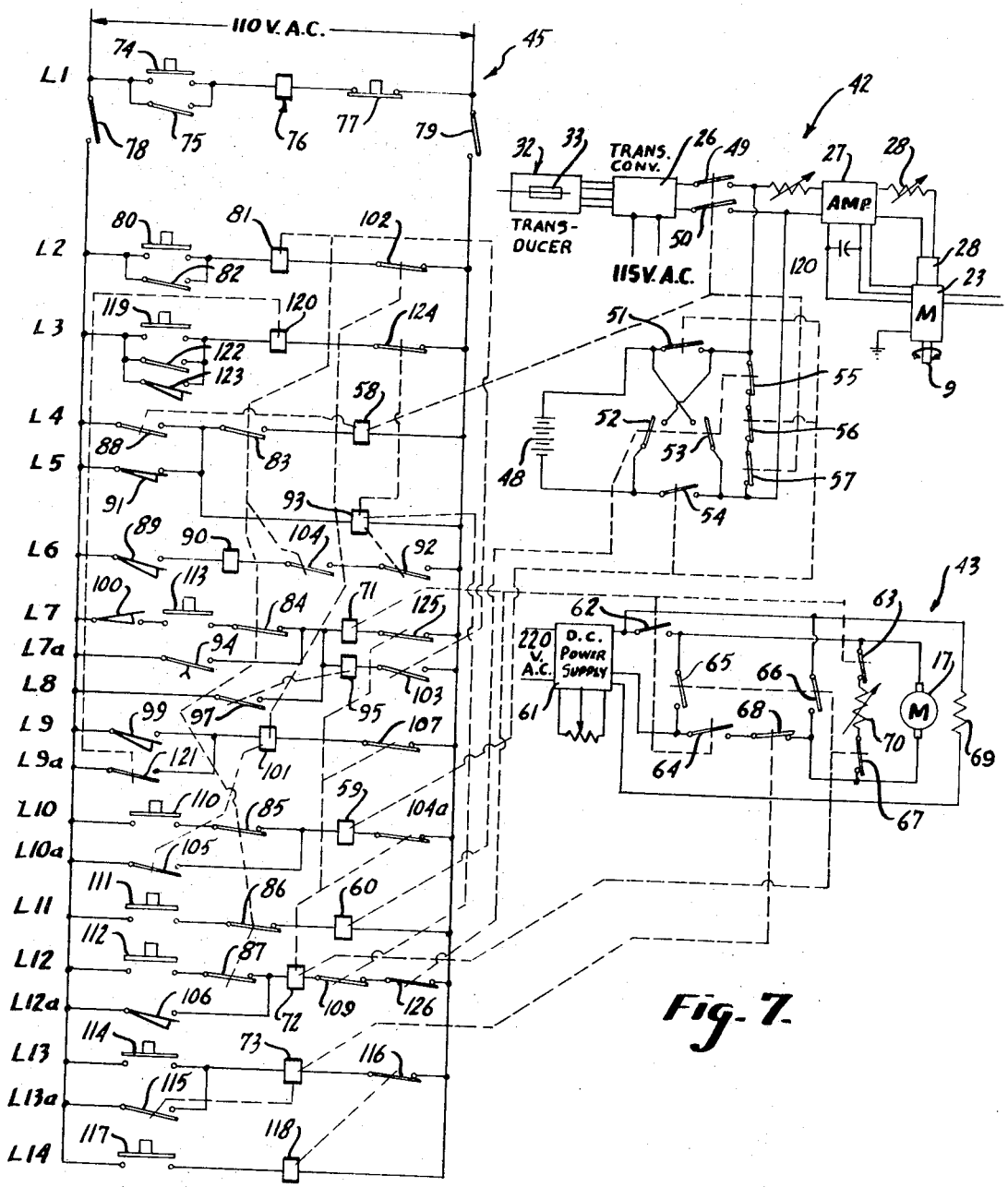
Fig. 7.
Fig. 8.
INVENTORS.
JOHN G. BOLLINGER
HOWARD L. HARRISON
MICHAEL A. STANKEY
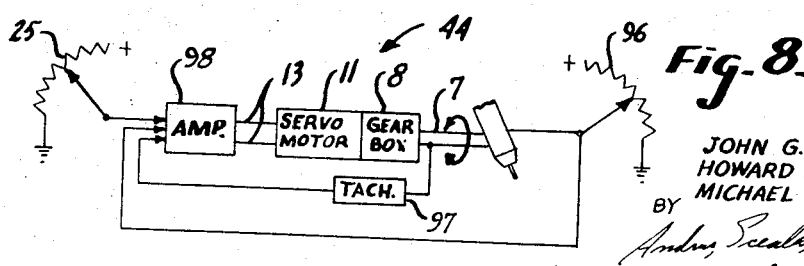
ATTORNEYS

United States Patent Office 3,542,996
Patented Nov. 24, 1970

---

ABSTRACT OF THE DISCLOSURE

A weld electrode tracking system for welding overlapping edges includes a water cooled copper probe riding on one edge. The probe is pivotally mounted and extends to within .12 to .78 inch of the arc. A linear variable differential transformer has a spring loaded core engaging the probe and generating analog voltage connected to energize an electrode motor for positioning the electrode with respect to the workpiece. An independent signal source includes a cam curved in accordance with the angle in the weld plane and a follower to maintain the proper angle at which the electrode is fed to the weld arc.

---

This invention is directed to an automated control system for high speed arc welding, and more particularly to a weld seam tracking system for automatically guiding a welding nozzle along a weld seam.

This is a divisional application of the application entitled "Automated Control System For High Speed Arc Welding" filed Apr. 18, 1966, with Ser. No. 543,160, and now Pat. No. 3,452,180, granted June 24, 1969.

A water cooled copper probe is disposed in very close proximity to the arc for sensing incipient changes in the seam contour of the workpiece. The changes in the seam contour are substantially immediately converted into electrical signals which are transmitted by means of an electrical control circuit to a motor means to produce compensating motions of the electrode holder to guide the arc along the seam being welded. The probe employed in the apparatus of the invention is disposed at a minimum target angle in relation to spatter generated by the arc. It is water cooled to withstand extremely high arc temperatures and to immediately "freeze" spatter which does contact it to thereby prevent spatter adherence.

The probe is provided with a linear variable differential transformer which converts seam tracking motions of the probe into electrical control signals. The control signals are then transmitted instantaneously to electric motor means for moving the electrode holder a distance and direction corresponding to the signal to maintain the arc in correct position relative to the workpiece for welding a non-linear seam. The control system requires no memory circuit and, in addition, applicant provides an independently operated electrode attitude control means to insure and maintain the correct angle of incidence between the workpiece and the electrode.

Many different electrode guide systems have been proposed in the past, but most of these have proved impractical in actual use due to the requirement of costly memory and time delay circuits, and because of short seam tracer life due to arc spatter and overheating. Prior to applicants' invention, no probe system was available which could operate best at distances less than three inches from a consumable electrode arc. No prior patent solved the problem of providing a continuous, smooth tracking motion which is capable of guiding an electrode holder around very close radii with minimal error by means of an electromechanical, single-edge sensing device capable of correcting either plus or minus seam contour changes to an equilibrium condition.

The patent to Morehead 3,171,012 discloses a weld seam tracking system which appears superficially similar to applicants' invention. That system, however, operates on incremental signals, and must be disposed in a groove having a pair of edges in order to track at all. Morehead deflects a fulcrumed probe between a plurality of contacts which then automatically drive the electrode in a predetermined direction until another counteracting signal is received from deflection of the probe in a different direction. The fulcrumed probe provides only an "on," "off" contact signal.

This invention provides sensor means to sense and track a weld seam or other similar work line and establish a control signal means for angularly orienting the weld electrode or other tool member about an axis to establish and maintain a selected optimum angular orientation with respect to said seam. In accordance with one aspect of this invention a cam member is provided with a profile related to the path of the work line profile and the required changes in the angular orientation of the tool member. A cam follower is coupled to move with the tool member and is correspondingly positioned by the cam. The cam follower is connected to a signal generator and provides a related control signal which is connected in a drive for positioning of tool members.

Applicants' apparatus provides accurate seam following on all types of weld seams and workpiece configurations, and requires no memory system to store the electrode guiding signals. The system is inherently infinitely variable, and not incremental in its guiding ability.

The drawings illustrate the presently preferred method of carrying out the invention.

In the drawings:
FIG. 1 of the drawings is a side elevation with parts broken away showing the apparatus of the invention generally;
FIG. 2 is an enlarged plan view with parts broken away of the welding head and probe taken from lines 2—2 in FIG. 1;
FIG. 3 is an enlarged end view with parts broken away of the apparatus shown in FIG. 2 taken along lines 3—3 of FIG. 1;
FIG. 4 is a schematic diagram illustrating the effect of electrode attitude angle and probe-to-electrode distance for a given radius of curvature on the X attitude error;
FIG. 5 is a schematic diagram showing the corrective effect accomplished by changing the attitude of the welding nozzle to the workpiece and also the residual Y curvature error;
FIG. 6 is a graph showing Y as a function of the actual probe-to-electrode distance and radii of curvature;
FIG. 7 is a schematic diagram showing the sequencing circuit, the control loop network and the carriage motor circuit; and
FIG. 8 is a schematic diagram showing the attitude control circuit for establishing the optimum angle of incidence between the welding electrode and the workpiece.

As shown in the drawings, an automatic welding assembly 1 includes a frame 2, a welding head 3, a welding head carriage assembly 4 and a welding head control assembly 5. The welding head 3 includes a weld seam probe transducer assembly 6 which is rigidly connected to the welding head 3 adjacent its lower end. The probe transducer assembly 6 and the welding head 3 are both disposed on a support bar 7, which is connected through a rotatable gear 8 to a carriage lead screw 9. Lead screw 9 is rotated to raise and lower the probe transducer assembly 6 and welding head 3 in relation to a workpiece 10.

The rotatable gear 8 is connected to a pivot motor 11, which is electrically connected to a cam control assembly 12 through electrical leads 13. Signals from the cam control assembly 12 operate motor 11 to rotate gear 8 and support bar 7 to change the attitude of the probe transducer assembly 6 and welding head 3 relative to workpiece edge 14 being welded. A control cam 15 of a particular design is used to keep the attitude of the welding head 3 in correct relation to edge 14 to maintain optimal welding conditions.

The welding assembly 1 includes, in addition to the above described parts, a motor drive 16 which includes a drive motor 17 having a pulley 18 and connected to the carriage assembly 4 to drive the carriage assembly 4, the probe transducer assembly 6, and the weld head 3 along the seam to be welded.

The weld head 3 and probe transducer assembly 6 are suspended from the carriage assembly 4 by means of the lead screw 9 through a carriage lead screw housing 20. The carriage assembly 4 includes rollers 21 which ride on a track 22 disposed along the upper surface of the frame 2. A servo motor 23 disposed on the carriage assembly 4 is connected to rotate the lead screw 9, thereby raising or lowering the weld head 3 and probe transducer assembly 6.

The cam control assembly 12 includes a spring loaded cam roller 24 which rolls along the pitch control cam 15 during welding. Control cam 15 is preselected to provide electrical signals to pivot motor 11 through the actuation of a potentiometer 25. These signals cause pivot motor 11 to adjust the attitude of the weld head 3 and probe transducer assembly 6 relative to the edge 14 to provide an optimal welding angle throughout the welding procedure and with a minimum tracking control error between the probe transducer assembly 6 and the weld head 3.

The welding head control assembly 5 receives error signals from the probe transducer assembly 6. These error signals are electrical, and are received in an AC-DC transducer converter 26 where a DC error signal is established. This DC error signal is fed through an amplifier 27 where it is amplified and transmitted as an AC correction signal to the servo motor 23 which rotates the lead screw 9. In addition, a tachometer generator 28 is provided on the servo motor 23 to provide a variable feedback signal to the amplifier from the servo motor 23, thereby providing additional stability for the servo drive by smoothing the system's response to error signals. The electrical sequencing circuit will be described more in detail below.

The most important feature of the subject invention is the probe transducer assembly 6. This assembly 6 includes a bracket 29 which supports a water cooled copper probe member 30 thereon. The probe member 30 includes a stylus 31 releasably secured to the main body of the probe member 30. The body of the probe member 30 is pivotally secured at its end remote from welding head 3 to the bracket 29 so that the probe member 30 and the stylus 31 can move to follow edge 14 being welded.

The bracket 29 also provides mounting means for a small linear variable differential transformer 32 which has a movable core 33. A sensing rod 34 extends into the core 33 of the transformer 32. The sensing rod 34 is preloaded against the upper surface of the pivoted probe member 30 by means of spring 35 and moves in response to movements of the stylus 31. Movement of the rod 34 moves the core 33 in transformer 32, thereby creating an AC error signal which corresponds to the deviation of edge 14. The signal ultimately causes the movement of the welding head 3 either up or down in relation to edge 14. When the welding edge 14 is not irregular and the stylus 31 senses "0" change, the transformer 32 produces a "0" error signal and the lead screw 9 does not rotate. The electrode 36, therefore, continues to track in a straight path along edge 14.

The distance between the stylus 31 and the tip of the electrode 36 should be as close as possible to obtain the most desirable tracking by electrode 36. As illustrated in FIG. 5, the amount of curvature error, $\Delta Y$, is a function of Z, which is the distance between the tip of the stylus 31 and the electrode 36. As set forth in the graph in FIG. 6, it can be seen that increases in the radius of curvature for a specific value of Z produce a curvature error distance $\Delta Y$. The smaller the value of Z for a given radius of curvature, the smaller is the error $\Delta Y$. As can be readily seen in FIG. 5, decreases in the distance Z significantly decrease $\Delta Y$, and therefore, the amount of error. The probe-to-electrode distance should be less than three inches in all processes utilizing the invention, and it has been determined that a probe-to-electrode distance ranging from .12–.78" works best, with the smaller distance being preferred.

FIG. 5 shows the additional reduction in tracking error gained by changing the attitude of the welding head 3 in relation to the workpiece 10. As can be seen, the most desirable attitude for the welding head 3 is an attitude in which the radius of curvature intersects the workpiece edge 14 at a point midway between the tip of stylus 31 and the electrode 36 and with the welding head disposed perpendicularly to a line tangent to the edge 14 and intersecting the point on the radius of curvature as best shown in FIG. 5. It can be seen that attitude control actually tends to cancel out any attitude and curvature errors.

The invention is well adapted to use with a continuous, consumable bare carbon steel electrode 36 fed from a coil (not shown) and shielded at the arc by $CO_2$ gas supplied through gas nozzle 38. This process inherently generates a relatively large quantity of metal spatter due to the violent arc action as the consumable electrode 36 is burned off in the $CO_2$ shielding gas.

The probe transducer assembly 6 is designed to be particularly adaptable to operation in a high spatter environment. The probe member 30 is provided with water cooling through the water hoses 39 connected thereto. As mentioned above, the member 30 is copper, and is selected for its excellent heat transfer characteristic. Spatter striking the water cooled probe member 30 and stylus 31 is cooled instantly, freezes and does not adhere to the members 30 and 31. Other materials having high thermal conductivity and high diffusivity could be used in the stylus 31 and probe member 30. For example, both gold and silver could be used, as well as other alloys having the required thermal conductivity.

The stylus 31 is disposed at a very low angle with the workpiece edge 14 and a relatively large angle relative to the axis of electrode 36 so that stylus 31 presents a minimum target angle for spatter generated at the arcing tip of electrode 36. As can best be seen in FIG. 2, the major portion of the arc generated spatter 40 is violently ejected from the arc along generally straight paths falling within a solid cone 41 having its apex in the arc. There is an annular region between the "spatter cone" 41 and workpiece 10 which is relatively spatter free. As can best be seen in FIG. 2, the stylus 31 is angularly disposed in this spatter-free region between the workpiece 10 and the spatter cone 41. The stylus 31 extends to within about .25" of the arcing tip of the electrode 36 and is connected at its other end to the water cooled probe member 30.

The most desirable minimum probe-to-electrode distances may be obtained, therefore, because of low angle disposition of the stylus 31 and because of the heat sink characteristics of the water cooled probe member 30. The stylus 31 is maintained at a sufficiently low temperature to permit long periods of generally continuous welding because of the excellent cooling effect of members 30 and 31. Because the stylus 31 and member 30 are maintained sufficiently cool and have excellent heat transfer characteristics, spatter which does strike them quickly freezes, and does not adhere.

The transformer 32, although disposed relatively close to the arc, is completely shielded from spatter by the probe member 30. Because of this shielding effect, it is possible to use a relatively short sensing rod 34 to sense movement of the pivoted probe member 30 and transfer these motions into the movable core 33 of the transformer 32.

As shown in FIG. 7, the electrical control system includes a control loop network 42 and a carriage motor circuit 43. The nozzle attitudes control circuit 44 is shown in FIG. 8 of the drawings. This latter circuit will be described later. Interconnecting the control loop 42 and the carriage motor circuit 43 is a sequencing circuit 45 which controls and integrates the operation of the control loop network 42 with the carriage motor circuit 43.

The control loop network 42 includes the linear variable differential transformer 32 and its movable core 33 which provides an infinitely variable analog voltage signal to the AC–DC transducer converter 26. In addition, the tachometer 28, the amplifier 27, a dummy signal source 48, a plurality of control relay contacts 49–57 are provided in the control loop network 42. Control relay contacts 49–54 are normally open, and control relay contacts 55–57 are normally closed. The amplifier 27, the tachometer 28 and the control relays 49–57 provide a desired analog signal which operates the AC servo motor 23. The servo motor 23 is connected to drive lead screw 9 clockwise or counterclockwise, depending on the direction of rotation of the servo motor 23. Clockwise rotation raises the welding head 3 by causing the carriage lead screw housing 20 to rise on the lead screw 9. The housing 20 connects at its upper end to a ball nut 57a, and is prevented from rotating by means of a slide (not shown). Movement of the welding head 3 returns the movable core 33 to the "null" position.

The welding head 3 is thereby automatically carried closer to the edge 14 through the action of lead screw 9 in response to error signals from the transformer 32. When the analog signal is "null," the lead screw 9 stops turning, and the welding head 3 will continue to operate at a constant level in relation to edge 14 until an analog signal is again received due to deviation in the contour of edge 14, sensed by the stylus 31 and transmitted through the linear variable differential transformer 32. Actuating coils 58–60 are provided to close (or open) the contact relays 49–57 in the correct sequence determined by the sequencing circuit 45.

The carriage motor circuit 43 comprises a DC power supply 61, a plurality of relay contacts 62–68 and a field 69 in the drive motor 17. A variable resistor 70 is provided in parallel with motor 17 for dynamic braking. The carriage motor circuit 43 is controlled by actuating coils 71–73 in the sequencing circuit 45. More specifically, coil 71 actuates normally closed switch 63 and normally open switch 64. Actuating coil 72 operates normally open switches 65 and 66 and normally closed switch 67. When coil 73 is energized, it opens normally closed switch 68.

A normally open main contact switch 74 is provided (line 1) to energize the sequencing circuit 45 initially. Once energized, relay coil contact 75 is closed and held closed by a relay coil contact 76 (line 1). A master "off" switch 77 (line 1) is also provided to de-energize the sequencing circuit 45 when desired. This switch is normally closed.

Energization of the coil 76 also closes main power switches 78 and 79 to energize the main legs of the circuit 45. Power is now available to a main cycle start button 80 (line 2) which is normally open. Closing button 80 energizes a cycle start relay coil 81 (line 2). The relay coil 81 closes a holding contact 82 (line 2), which provides a current path to coil 81 after button 80 reopens. Coil 81 also closes a plurality of operating contacts 83 (line 4), 84 (line 7), 85 (line 10), 86 (line 11) and 87 (line 12) to commence the operation of the welding apparatus. Closing of the contact 83 (line 4) provides current to energize the relay coil 58 (line 4), which, when energized, closes a contact 88 (line 4) and contacts 49 and 50 in the control loop circuit 42 to place the transducer 32 into the circuit. A third, normally closed contact 57 is simultaneously opened by the coil 58.

Assuming the stylus 31 is above the edge 14, the transformer 32 will detect error and cause the welding head 3 to descend to bring the stylus 31 in contact with the edge 14. When the edge 14 is contacted, and the stylus 31 is balanced through the transformer core 33 to a "null" position, the limit switch 89 (line 6) closes, thereby energizing timer 90, provided limit switch 91 (line 5) has also been actuated to close contact 92 (line 6) through the action of relay coil 93 (line 5). The limit switch 91 will ordinarily be actuated when the welding head 3 is at the far left side of the welding fixture as viewed in FIG. 1. Once energized, the coil 93 can be held in until the end of the cycle by the contact 88 (line 4), which was actuated by the coil 58 (line 4).

The timer 90 closes its associated timer contact 94 after a timed period. This action energizes relay coil 95 (line 7a–8), which closes the control circuit (not shown) of the welding head 3 to provide welding current, shielding gas and electrode feed to the electrode 36. When the energized electrode 36 contacts the workpiece 10, an arc is struck and welding commences.

Closing timer contact 94 also energizes the relay coil 71 (line 7), which is adapted to close normally open contacts 62 and 64 in the carriage motor circuit 43. Coil 71 also opens normally closed contact 63 in the carriage motor circuit 43, thereby removing variable resistor 70 from the circuit to allow full current to be applied to the carriage motor 17.

Welding now proceeds while the welding head 3 moving along edge 14 of the workpiece 10 and the stylus 31 contacting the edge 14 immediately ahead of the electrode 36. As explained above, contour changes of the edge 14 displace the stylus 31, creating a DC error signal in the transformer 32. This signal is converted through the control loop network 42 into mechanical motion of the lead screw 9 driven by the servo motor 23, which receives an AC correction signal from the control loop network 42.

Simultaneously, the nozzle attitude control circuit 44 is energized. As shown in FIG. 8 of the drawings, the circuit includes the pivot motor 11, the potentiometer 25, a feedback potentiometer 96, a stabilizing tachometer 97 and an amplifier 98. As mentioned above, the cam control assembly 12 provides mechanical input signals to the potentiometer 25 as the cam roller 24 rolls along the control cam 15. Control cam 15 has been preselected based on the general contour of the workpiece to provide a signal which is translated into an electrical signal by potentiometer 25, amplified by amplifier 98 and fed to servo motor 11 to cause a mechanical input to gear box 8 to rotate support bar 7 the amount required to maintain the welding head 3 in the correct orientation for optimum welding conditions, and to minimize the errors of probe member 30 as mentioned previously.

After the welding head 3 has moved across the frame 2 and welding has been completed, stop cycle limit switch 99 (line 9) is actuated. A second limit switch 100 (line 7) is also opened. Opening of switch 99 de-energizes the welding circuit (not shown) and welding stops. Also, a holding coil 101 (line 9) is energized to open a normally closed contact 102, thereby de-energizing the cycle start relay coil 81 (line 2). This operates the contacts 83 (line 4), 84 (line 7), 85 (line 10), 86 (line 11) and 87

(line 12) to reopen contact 83 and reclose contacts 84–87. A contact 103 (line 8) is also reopened by de-energizing the coil 81 (line 2). Opening contact 103 de-energizes coil 95 (line 8) and its associated contact 97 reopens. Opening of contact 97 insures that no current will flow through any portion of line 8 unless timer contact 94 recloses.

At the same time, a relay contact 104 (line 6) is reopened, thereby de-energizing timer coil 90 (line 6). Timer contact 94 reopens and thereby assures the cutoff of current flow through either line 7 or 8, because contact 97 (line 8) has opened, as mentioned above. With line 7 de-energized, the coil 71 is de-energized, thereby reopening contact 62 and 64, and reclosing contact 63 in the carriage motor circuit 43 to stop the carriage motor.

As mentioned, closing of the limit switch 99 (line 9) energized coil 101 to open normally closed contact 102 (line 2). Coil 101 also closes normally open contact 105 (line 10a) to energize relay coil 59 (line 10) which thereupon closes contacts 51 and 54 and opens contact 56 in the control loop network 42 to throw a dummy voltage signal onto motor 23 from dummy voltage signal source 48. This signal rotates lead screw 9 to raise welding head 3 to the starting position preparatory to repeating the welding cycle. The dummy signal controls the motor 23 at this point, because contacts 49 and 50 have reopened, isolating the transformer 32 from the loop control network 42. When the point is reached where welding head 3 should stop its upward motion, a stop limit switch 106 (line 12a) is closed to energize the relay coil 72 (line 12). This opens contact 104a (line 10) to de-energize coil 59 (line 10) thereby removing the dummy voltage signal source 48 from the control loop network 42 and stopping the raising of welding head 3.

Energizing the relay coil 72, in effect, also opens a contact 107 (line 9). This de-energizes coil 101 (line 9) and thereby reopens contact 105 (line 10a) so that coil 59 is de-energized both through line 10 and 10a. Coil 72 also closes contacts 65 and 66 in the carriage motor circuit 43 to drive the welding head 3 to the left. A normally closed contact 67 is opened by coil 72 to remove the variable resistor 70 from the circuit 43 of the motor 17 to permit a full speed return to the weld start position.

When the welding head 3 has returned to the far left position, it actuates the limit switch 91 (line 5) which de-energizes coil 93 (line 5), opening a contact 109 (line 12). This de-energizes coil 72, opening contacts 65 and 66 in the carriage motor circuit 43 and stopping the welding head 3 at the far left position, where the cycle may now be repeated.

Manual control can be incorporated into the system, of course. For example, pushbutton controls 110–113 for UP, DOWN, LEFT and RIGHT motions can be added to lines 10, 11, 12 and 7 respectively. Other additional pushbutton controls can be added to stop the cycle at any point and continue as desired. For example, a STOP button 114 is provided to energize coil 73, which, when energized, opens normally closed contact 68 in the carriage motor control circuit 43 and cuts off the carriage motor 17. Actuation of the coil 73 also closes a normally open contact 115 (line 13a) to hold the line 13a–13 in the circuit when button 114 again opens. A second normally closed contact 116 (line 13) is provided in line 13, and is opened by depressing a CONTINUE button 117 (line 14) which energizes a relay coil 118 (line 14). This coil opens normally closed contact 116 to permit normally closed contact 68 to again close upon de-energizing of its coil 73.

A STOP-RETURN button 119 (line 3) can be provided which is depressed to energize a relay coil 120 (line 3). The relay coil 120 closes normally open contact 121 (line 9a) to energize relay coil 101 (line 9) even when the limit switch 99 is open. In this way, the cycle may be stopped through operation of the coil 101, etc., *without* first closing the limit switch 99. In addition, coil 120 has a holding contact 122 around the button 119 to hold the circuit in after the button 119 reopens. A limit switch 123 (line 3) is also provided which will close to energize coil 120 even when the button 119 is not depressed. The limit switch 123 is disposed on the welding head 3 to be closed when the welding head 3 reaches its bottom limit of travel. When limit switch 123 closes, it also stops the weld cycle and commences the return cycle. Normally closed contact 124 (line 3) can be provided to disenable line 3 when the limit switch 91 has been energized, thereby energizing coil 93 which opens switch 124. A normally closed contact 125 (line 7) is also provided to disenable the right movement whenever the relay coil 72 is energized, thus insuring that when the carriage motor is to be driven to the left, no current will flow to short out the then open switches 62 and 64 in the carriage motor circuit 43. A similarly functioning normally closed contact 126 (line 12) is provided to insure that coil 72 will not be energized at the same time coil 71 is energized to drive the carriage to the right.

Other additional controls can also be included, and will be readily apparent. The description above is believed sufficient to fully point out the operation of the invention and the nature of the advance applicants have made in automated seam welding.

The invention provides an accurate electromechanical automatic welding system which provides accurate control of the welding head movement along a contoured seam being welded. The system provides a substantially instantaneous response to changes in direction of the weld seam to guide the electrode along in the most optimum attitude for welding.

The probe tracking apparatus is disposed at a distance of less than three inches from the arc and preferably at about one-eighth of an inch to provide accurate tracking without requiring a memory system. The probe is resistant to arc temperatures and is disposed below the "spatter cone" to further enhance its useful life.

The apparatus utilizes a linear variable differential transformer to convert the physical changes in the weld seam into an electrical control signal which is amplified and then fed to the welding head guide motors to correct the position of the welding head back to a "0" error position.

We claim:

1. In a tool positioning control for positioning a tool member with respect to changing the tool work path along a workpiece in a given plane, comprising mounting means for said tool member, control means connected to said tool member for independently moving said tool member along a pair of perpendicular rectilinear paths in a given plane including said tool work path and including a transducer means in contact with the workpiece continuously and directly sensing the movement of said tool work path in one of said rectilinear paths immediately adjacent said tool member and establishing an electrical control signal for positioning the tool member along the corresponding rectilinear path to maintain a fixed relationship within said pair of rectilinear paths in said given plane and thereby to maintain the end of the tool member moving along said tool work path, drive means to rotate the tool member about an axis perpendicular to said given plane for varying the introduction angle of said tool member, generating means including a cam having a profile corresponding to a preselected introduction angle of said tool member into said work path and a cam follower following said cam profile and coupled to an electrical signal means for establishing an electrical control signal corresponding to said preselected angle, and motor means coupled to said signal means and to said drive means to maintain the selected angular position of said tool member as the tool member is moved in said two rectilinear paths.

2. The tool positioning control of claim 1, wherein said generating means produces a signal related to a perpendicular relationship of the tool member and the work path for all positions along said work path.

3. The tool positioning control of claim 1, wherein said generating includes means movable in accordance with the tool member for establishing said signal.

4. The tool positioning control of claim 1, wherein said transducer means includes a follower immediately adjacent the tool tip and simultaneously moving along said work path in front of said tool member, said generating means establishes a signal related to a fixed angular relationship of the tool member and the work path for all positions along said work path to maintain said tool member perpendicular to a line tangent to a point between said follower and said tool tip.

5. The tool positioning control of claim 1, wherein said transducer means includes a differential transformer to establish a continuous control signal for moving said tool member in said one path, and said control means including a means to support said tool member for fixed movement along the second rectilinear path.

References Cited

UNITED STATES PATENTS

| | | | |
|---|---|---|---|
| 2,288,032 | 6/1942 | Smith | 219—125 |
| 2,839,663 | 6/1958 | McCollam | 219—76 |
| 2,927,992 | 3/1960 | Bateman | 219—125 |
| 3,122,970 | 3/1964 | Rhoades | 336—30 X |
| 3,150,624 | 9/1964 | Brems | 219—125 X |
| 3,158,121 | 11/1964 | Brems | 219—125 X |
| 3,171,012 | 2/1965 | Morehead | 219—124 |
| 3,408,475 | 10/1968 | Fier | 219—125 |

JOSEPH V. TRUHE, Primary Examiner

L. A. SCHUTZMAN, Assistant Examiner

U.S. Cl. X.R.

90—62; 228—7, 8